Feb. 22, 1966 D. M. CHAMBERLAIN ETAL 3,237,173

MEMORY CONSTRUCTION

Filed Jan. 17, 1962

2 Sheets-Sheet 1

INVENTORS
DONALD M. CHAMBERLAIN &
NELSON H. SAVOIE

BY Carl V. Olson

Attorney

MEMORY CONSTRUCTION

Filed Jan. 17, 1962

2 Sheets-Sheet 2

INVENTORS
DONALD M. CHAMBERLAIN
& NELSON H. SAVOIE
BY Carl V. Olson
Attorney

United States Patent Office 3,237,173

Patented Feb. 22, 1966

3,237,173
MEMORY CONSTRUCTION

Donald M. Chamberlain, Dedham, and Nelson H. Savoie, Tewksbury, Mass., assignors to Radio Corporation of America, a corporation of Delaware Filed Jan. 17, 1962, Ser. No. 166,762
6 Claims. (Cl. 340—174)

This invention relates to the construction of memories, and particularly to the construction of random access magnetic memories which include means for maintaining the temperature of the memory at a predetermined constant value. Memories of the type under consideration are useful, for example, in electronic data processing apparatus.

Random access memories are usually constructed of ferrite magnetic cores arranged in rows and columns to form a memory plane. The apertures in the cores are threaded by wire conductors for writing digital information into the cores and reading the digital information out from the cores. A plurality of such memory planes is mounted in coextensive parallel relationship to form a memory stack.

Ferrite magnetic cores have many characteristics which make them particularly useful as memory elements in a random access memory. However, the electro-magnetic characteristics of ferrite cores are undesirably affected by excessive changes in ambient temperature. It is, therefore, often necessary, in order to insure reliable operation of the memory, to require that the memory be operated solely in an environment where the temperature remains at a relatively stable level, such as room temperature.

When a magnetic memory is to be used in an environment where the temperature is expected to vary, it is known to enclose the memory in a thermostatically controlled "oven." However, the operation of a memory in a thermostatically controlled oven has not proved to be entirely satisfactory because of the difficulty in maintaining all internal parts of the memory at the thermostatically controlled temperature in the oven. This difficulty is due, in part, to the fact that the operation of the memory results in the generation of heat at the particular places in the memory that are addressed for the writing in and reading out of information. The previously known temperature controlled memories have not possessed the thermal characteristics necessary to insure a uniform temperature throughout the memory.

It is therefore a general object of this invention to provide an improved memory construction characterized in that the temperature throughout the memory may be maintained at a uniform, constant and controllable value.

It is another object to provide an improved temperature controlled magnetic memory construction wherein all magnetic memory elements are equally close to a thermostatically controlled heating element.

It is a further object of this invention to provide an improved memory construction including means to maintain the entire memory at a uniform, fixed, predetermined temperature having a value above the highest ambient temperature which the memory system is expected to encounter.

It is yet another object to provide an improved memory construction wherein the individual memory elements are rigidly, but resiliently, supported and insulated from external shocks of both mechanical and thermal natures.

According to an example of the invention, a memory is constructed of units each including a heater plane interposed between two coextensive memory planes, the memory planes consisting of systematically arranged rows and columns of ferrite magnetic cores threaded by driving and sensing wires or windings. The heater plane is a unitary structure including, in the order named, a first sheet of silicone impregnated fiberglass cloth, a first sheet of metal such as copper, a second and third sheet of silicone impregnated fiberglass cloth with a resistance wire heating element inserted therebetween, a second sheet of metal such as copper, and a fourth sheet of silicone impregnated fiberglass cloth. The unit including the two memory planes with the interposed heater plane is encapsulated in a potting compound having a high thermal conductivity characteristic. A preferred potting compound is a silicone rubber having a filler providing the high degree of thermal conductivity.

A memory stack can be made from a number of the abovedescribed units, all the units being encapsulated in the potting compound in such a way as to prevent the occurrence of air voids. The potted memory planes and interposed heater planes are suspended within a supporting frame of larger dimensions, and the space therebetween is filled with a foamed-in-place plastic such as polyurethane.

The potted assembly includes a centrally-positioned heat sensing element such as a thermistor. A thermostat circuit outside the potted assembly is connected from the thermistor to the heater planes and operates to maintain the potted assembly at a uniform, constant, predetermined temperature higher than any expected ambient temperature.

These and other objects and aspects of the invention will be apparent to those skilled in the art from the following more detailed description taken in conjunction with the appended drawing, wherein.

Figure 1:
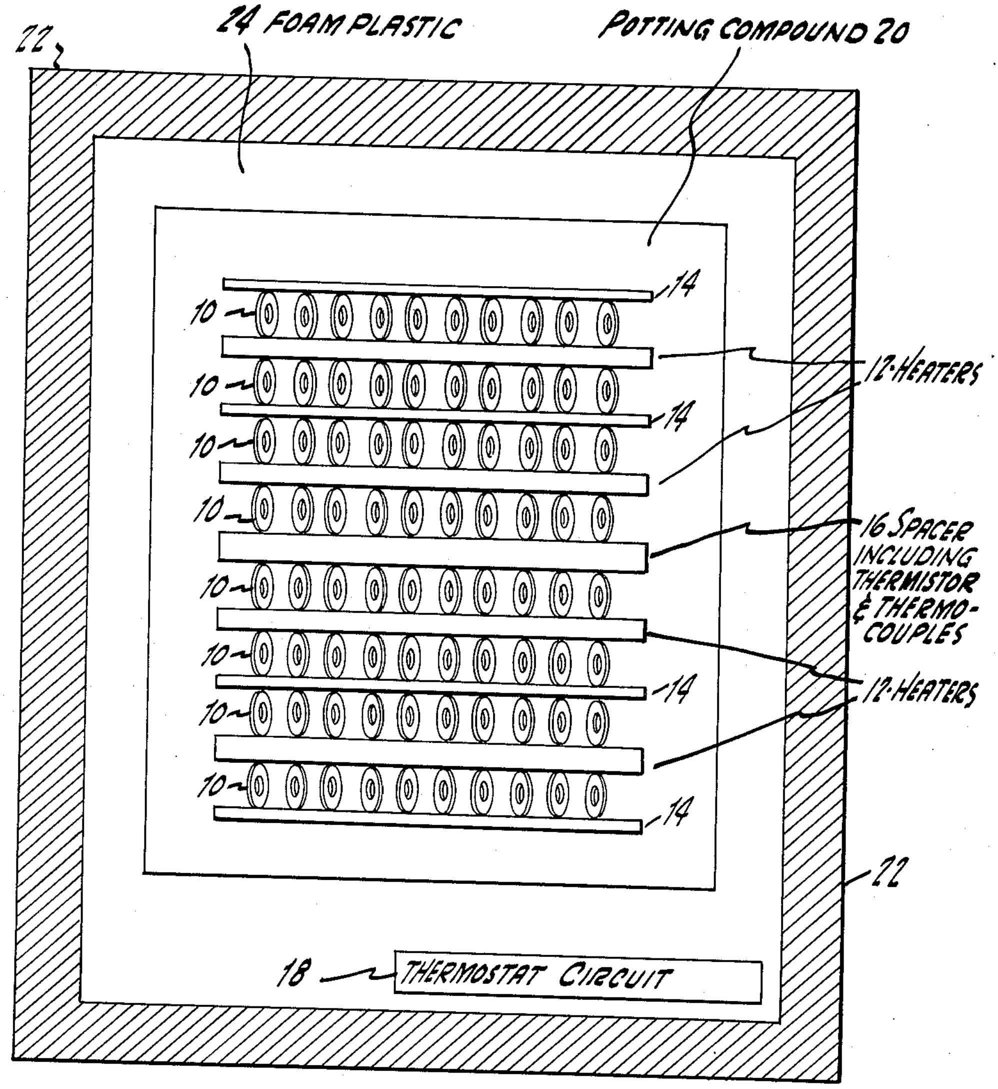
FIGURE 1 is a diagrammatic sectional view of a temperature controlled magnetic core memory constructed according to the teachings of this invention.

Reference is now made to FIGURE 1 showing a diagrammatic sectional view of a memory constructed according to the invention. Several memory planes 10 are shown each of which consists of rows and columns of ferrite magnetic cores, only one row of cores being visible in the view of FIGURE 1. The cores are provided with drive and sense windings which are omitted from the drawing of FIGURE 1 for reasons of clarity of illustration. Four heater planes 12 are arranged so that each is interposed between two of the memory planes 10. One heater plane 12 and the two adjacent memory planes may be viewed as a unit, there being four such units forming the memory stack illustrated in the memory of FIGURE 1. The heater planes 12 will be described in detail in connection with FIGURES 2 and 3 of the drawing.

Thin spacer planes 14 and a thick spacer plane 16 are interposed between the units each of which consists of two memory planes with an interposed heater plane. The thin spacer planes 14 consist of a sheet of silicone rubber impregnated fiberglass cloth. The thick spacer plane 16 consists of thermistors and thermocouples surrounded by sheets of silicone rubber impregnated fiberglass cloth, or silicone rubber potting compound having high thermal conductivity. The thermistors are connected by leads (not shown) to a transistor thermostat circuit 18. The thermostat circuit has an output connected by lead (not shown) to all of the heater planes 12. The thermocouples in the thick spacer plane 16 are connected by leads (not shown) to a temperature indicating instrument (not shown) outside the memory.

All of the memory planes 10, the heater planes 12 and the spacer planes 14 and 16 are encapsulated in a potting compound in a block having an outline 20. The potting compound is a liquid which solidifies to form a rigid, but resilient, solid having a high thermal conductivity characteristic. A suitable potting compound is a compound type CS-3801 sold by the Chem Seal Corporation of Los Angeles, California. This potting compound is a silicone rubber having a filler providing a good heat transfer characteristic.

The thermal conductivity of a material is measured in terms of a thermal conductivity factor K, which may be defined as equal to the number of British thermal units (B.t.u.) per hour which are conducted through a one square foot sample having a thickness of one inch and a temperature difference of one degree Fahrenheit between the surfaces. The K of silicone rubber is about 0.25, and the K of silicone rubber having a heat conducting filler is about 0.75. In practicing the invention, a potting compound having a good heat transfer characteristic, or a thermally conductive potting compound, is one having a thermal conductivity factor K of 0.6 or over.

In the construction of the potted or encapsulated stack assembly 20, the various planes are successively put in position in a rectangular mold and each plane is covered with the liquid potting compound before the next successive plane is superimposed on it. Alternatively, if the potting compound has a sufficiently low viscosity, the liquid potting compound can be poured finally into positioned planes. The potted assembly is built up without air voids between the magnetic cores of the memory planes and between the spacer and heater planes. All of the windings and leads (not shown) connecting the memory planes 10, the heater planes 12 and the spacer planes 16 are arranged to extend out from the walls of the solidified potting compound 20. Because the potting compound 20 has a high thermal conductivity, all points within the potting structure tend to assume the same temperature. Therefore, all the cores of the memory planes 10 are maintained at substantially the same temperature.

The encapsulated stack assembly 20 is suspended in spaced relationship on all six sides in a supporting frame 22, which is preferably made of a non-ferrous metal such as aluminum, or a plastic such as epoxy. Then the intervening space is filled with a foamed-in-place plastic 24 such as polyurethane. The plastic is poured into place in liquid form, and then it foams and completely surrounds the encapsulated stack 20. The foamed plastic hardens and provides a supporting structure 24 for the encapsulated stack 20 which provides thermal insulation between the stack 20 and the frame 22, and also provides a cushioning against mechanical shock or vibration. The potted stack 20 is supported within the frame prior to the application of the liquid foam plastic by some means, such as by supporting the stack on previously foamed stilts of polyurethane, so that the final product is one wherein there are no thermally conductive brackets or supports of any kind between the stack 20 and the metal frame 22. The foamed plastic has a thermal conductivity factor of about 0.2.

Figure 2:
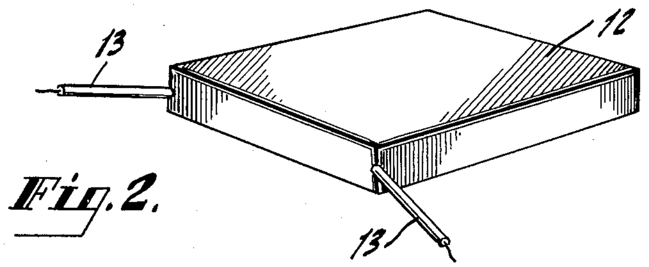
FIGURE 2 is an isometric view of one of the heater planes included in the memory of FIGURE 1.

FIGURE 2 is an isometric view of one of the heater planes 12 of FIGURE 1 showing the terminals of the heater wire 13 extending from the plane.

Figure 3:
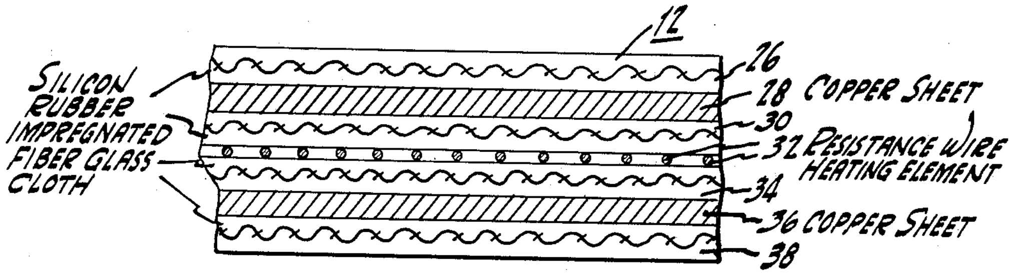
FIGURE 3 is a fragmentary enlarged sectional view through the heater plane of FIGURE 2 illustrating its laminated construction.

FIGURE 3 shows a fragmentary cross-sectional view through the heater plane 12 of FIGURE 2. The unitary assembly includes, in the order named, a first sheet 26 of silicone rubber impregnated fiberglass cloth, a sheet 28 of high thermal conductivity material such as copper, a second sheet 30 of silicone rubber impregnated fiberglass cloth, a sheet array 32 of a resistance wire heating element preferably constructed of "Nichrome" wire, a third sheet 34 of silicone rubber impregnated fiberglass cloth, a second sheet 36 of high thermal conductivity material such as copper, and a fourth sheet 38 of silicone rubber impregnated fiberglass cloth. The heater plane 12 is a lamination constructed to be free of air voids. The heater plane has a very high thermal conductivity because, although the conductivity factor K of silicone rubber impregnated fiberglass cloth is only about 0.4, the conductivity factor K of copper is about 2000. The construction is thus one which tends to have a uniform temperature throughout. All the materials are well suited to withstand temperatures in the range from about −55° C. to very much over 80° C. In operation, the heater plane 12 and the entire encapsulated memory stack block 20 (FIGURE 1) may be maintained at a constant temperature such as, for example, 80° C. within plus or minus 2° C.

Figure 4:
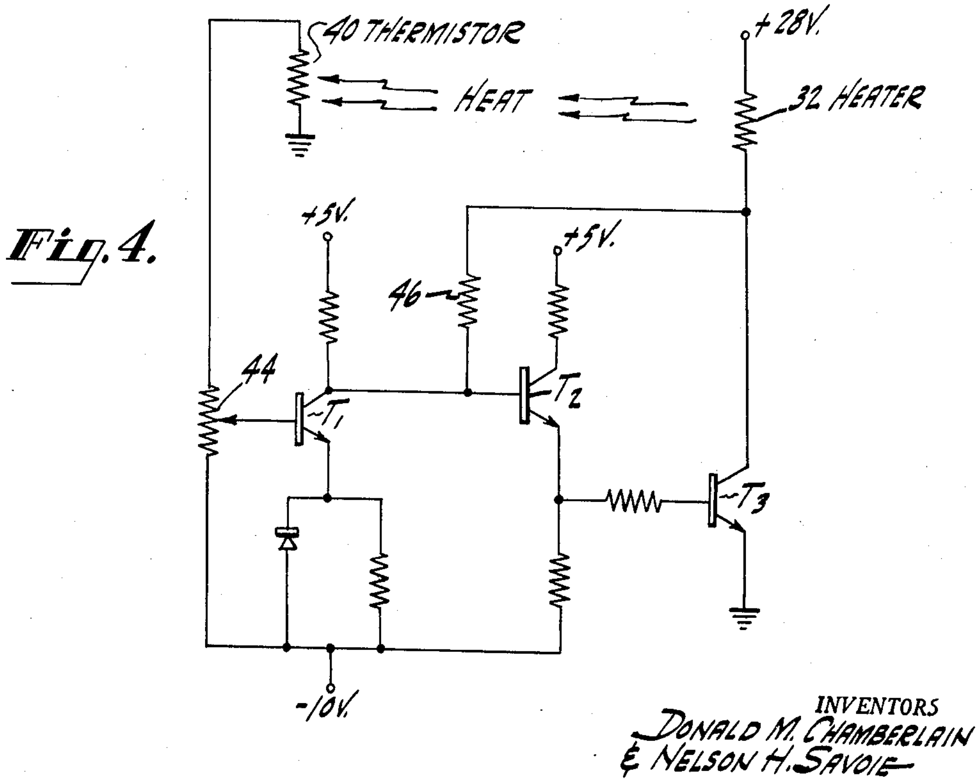
FIGURE 4 is a circuit diagram of a thermostat circuit suitable for use in the memory of FIGURE 1.

FIGURE 4 shows a transistor circuit suitable for use in the box 18 of FIGURE 1 for providing thermostatic control of the encapsulated memory stack 20. The circuit includes a thermistor 40 located in the spacer 16 in FIGURE 1. The circuit also includes a heater resistor 32 which corresponds with the resistance wire heating element 32 in FIGURE 3 and the similar resistance wire heating elements in the other three heater planes 12 in FIGURE 1. The thermistor 40 presents a resistance which varies in accordance with its temperature. Its temperature is, in turn, affected by heat given off by the resistance wire 32. The thermistor 40 is connected in a sort of bridge circuit constituting the input circuit of the transistor $T_1$. The potentiometer 44 in the bridge circuit provides a control for setting the desired temperature which it is desired to maintain in the memory stack 20, which includes the thermistor 40. The transistors $T_1$, $T_2$ and $T_3$ are connected to form a current amplifier. The current input to transistor $T_1$ may be in the range of from 0 to 1 or 2 milliamperes, and the amplified current supplied by transistor $T_3$ to the resistance wire 32 may vary in the range from 0 to 2 amperes. The resistor 46 is added to provide a certain amount of negative feedback to stabilize the operation of the circuit. The circuit therefore operates to provide just that amount of heat from the resistance wire 32 which will maintain the temperature of the thermistor 40, and the surrounding memory planes 10, at a predetermined fixed desired temperature, such as 80° C.

It is seen that according to this invention there is provided a temperature controlled memory construction capable of being maintained at a uniform, fixed temperature, within plus or minus 2° C., even though the ambient temperature may vary over a range such as −55° C. to 75° C. By maintaining all parts of the memory at a fixed uniform temperature of, say 80° C., the memory operates reliably with uniform operating characteristics.

What is claimed is:

1. A temperature controlled magnetic memory construction comprising a stack including a plurality of magnetic memory planes, a plurality of heater planes interposed between said memory planes, and a spacer plane including a temperature sensing element, each of said heater planes including a first sheet of silicone rubber impregnated fiberglass cloth, a first sheet of metal, a second sheet of silicone rubber impregnated fiberglass cloth, a resistance wire heating element, a third sheet of silicone impregnated fiberglass cloth, a second sheet of metal, and a fourth sheet of silicone impregnated fiberglass cloth, all arranged in the order named, a potting compound surrounding and encasing said stack, said potting compound comprising silicone rubber and a filler providing a good heat transfer characteristic, a supporting frame surrounding and spaced from said potted stack, and a foam plastic filling the space between said potted stack and said frame.

2. A temperature controlled magnetic memory construction comprising a stack including a plurality of magnetic memory planes, a plurality of heater planes interposed between said memory planes, and a spacer plane including a temperature sensing element, each of said heater planes including a first sheet of silicone rubber impregnated fiberglass cloth, a first sheet of copper, a second sheet of silicone rubber impregnated fiberglass cloth, a resistance wire heating element, a third sheet of silicone impregnated fiberglass cloth, a second sheet of copper, and a fourth sheet of silicone impregnated fiberglass cloth, all arranged in the order named, a potting compound surrounding and encasing said stack, said potting compound comprising silicone rubber and a filler providing a good heat transfer characteristic, a supporting frame surrounding and spaced from said encased stack, and a foam plastic filling the space between said encased stack and said frame.

3. A temperature controlled magnetic memory construction comprising a plurality of magnetic memory planes, at least one heater plane interposed between said memory planes, said heater plane including, first and second sheets of metal, an electric heating element interposed between said sheets of metal, sheets of silicone rubber impregnated fiberglass cloth insulating said heating element from said sheets of metal, a potting compound surrounding and encasing said memory planes and said heater plane, a supporting frame surrounding and spaced from said encased planes, and a foam plastic filling the space between said encased planes and said frame.

4. A temperature controlled magnetic memory construction comprising a plurality of magnetic memory planes, at least one heater plane interposed between said memory planes, said heater plane including, in the order named, a first sheet of silicone rubber impregnated fiberglass cloth, a first sheet of metal, a second sheet of silicone rubber impregnated fiberglass cloth, an electric wire heating element, a third sheet of silicone rubber impregnated fiberglass cloth, a second sheet of metal and a fourth sheet of silicone rubber impregnated fiberglass cloth, a potting compound surrounding and encasing said memory planes and said heater plane, a supporting frame surrounding and spaced from said encased planes, and a foam plastic filling the space between said encased planes and said frame.

5. In a temperature controlled magnetic memory, the combination of a unitary heater plane, said heater plane including, a first sheet of impregnated glass cloth, a first sheet of metal, a second sheet of impregnated glass cloth, a resistance wire heating element, a third sheet of impregnated glass cloth, a second sheet of metal, and a fourth sheet of impregnated glass cloth, all arranged in the order named, memory planes of wired ferrite magnetic cores located on both sides of said heater plane, and a thermally conductive potting compound encapsulating said heater plane and said memory planes.

6. In a temperature controlled magnetic memory, the combination of a unitary heater plane, said heater plane including, a first sheet of silicone rubber impregnated glass cloth, a first sheet of metal, a second sheet of silicone rubber impregnated glass cloth, a resistance wire heating element, a third sheet of silicone rubber impregnated glass cloth, a second sheet of metal, and a fourth sheet of silicone rubber impregnated glass cloth, all arranged in the order named, memory planes of wired ferrite magnetic cores located on both sides of said heater plane, and a potting compound encapsulating said heater plane and said memory planes, said potting compound comprising a silicone rubber and a filler providing a good heat transfer characteristic.

References Cited by the Examiner

UNITED STATES PATENTS

| | | | |
|---|---|---|---|
| 2,870,277 | 1/1959 | Carter | 219—19 |
| 2,919,434 | 12/1959 | Mestre | 340—174 |
| 3,009,044 | 11/1961 | Doehler | 219—19 |
| 3,009,045 | 11/1961 | Porter | 219—19 |
| 3,028,473 | 4/1962 | Dyer et al. | 310—8.9 X |
| 3,124,787 | 3/1964 | Bartik | 340—174 |

FOREIGN PATENTS

| | | |
|---|---|---|
| 820,645 | 9/1959 | Great Britain. |

IRVING L. SRAGOW, *Primary Examiner.*